Remington & Beale,
Edging Timber.
No. 4,929. Patented Jan. 15, 1847.
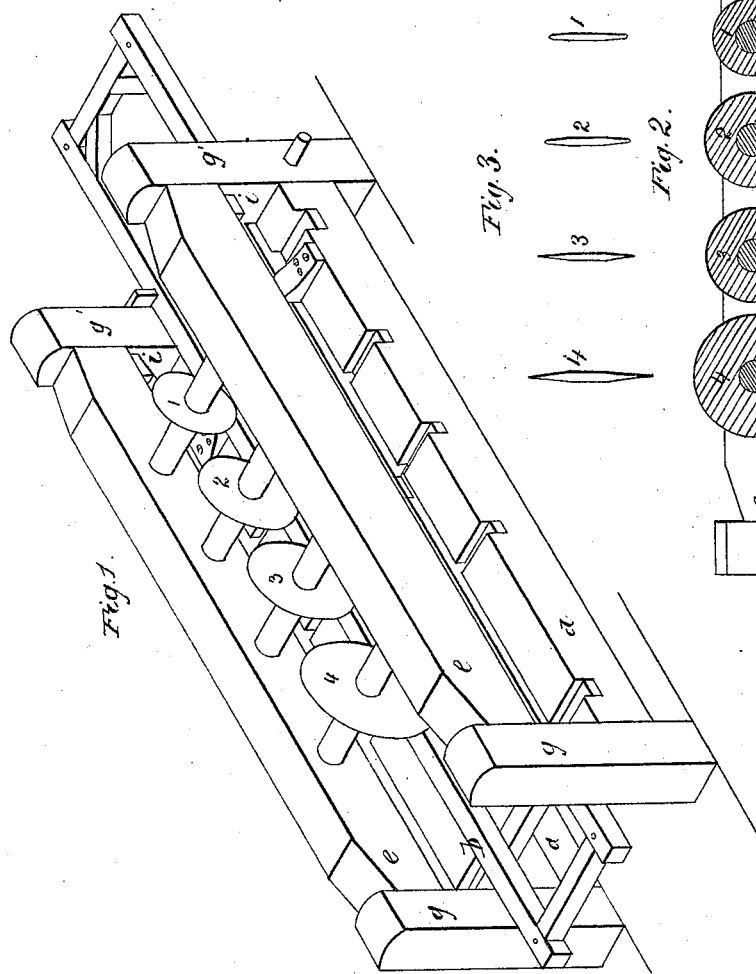
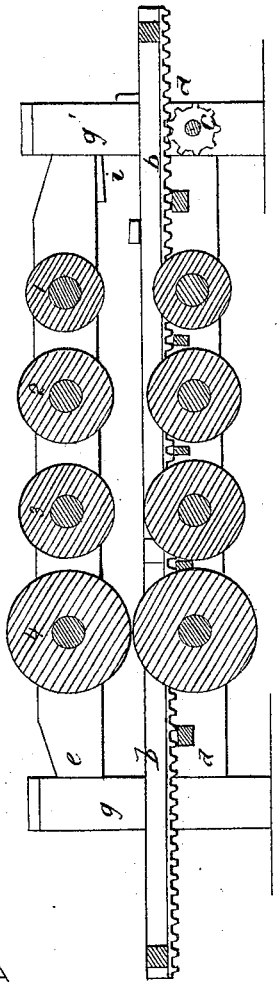

UNITED STATES PATENT OFFICE.

JOHN R. REMINGTON, OF LOWNDES COUNTY, ALABAMA, AND ROBERT BEALE, OF WASHINGTON, DISTRICT OF COLUMBIA.

MACHINERY FOR SLITTING BOARDS, &c.

Specification of Letters Patent No. 4,929, dated January 15, 1847.

*To all whom it may concern:*

Be it known that we, J. R. REMINGTON, of Lowndes county, in the State of Alabama, and ROBERT BEALE, of Washington, in the District of Columbia, have invented new and useful Improvements in Machines for Splitting or Cutting Out Planks, &c., and that the following is a full, clear, and exact description of the principle or character which distinguishes them from all other things before known and of the manner of making, constructing, and using the same, reference being had to the accompanying drawings, making part of this specification, in which—

Figure 1 is a perspective view of the machine; Fig. 2, a vertical longitudinal section through the cutters, and Fig. 3, an edge view of the cutters.

The same letters indicate like parts in all the figures.

The nature of our invention consists in the application of a double series of cutters placed in line with each other; the first cutters of the series are made blunt on the edge and serve only to mark a short distance into the surface of the plank to be cut; the second pair are thinner and are placed closer together and they of course go deeper, and so on through the series, each successive pair being made thinner and marking or cutting deeper till the last pair meet in the center or nearly so.

The construction of the machine may be as follows: The bed cutters are hung on shafts which have their bearings in two horizontal string pieces ($a$) of the frame; over these axles a carriage ($b$) moves back and forth impelled by a pinion ($c$) working into a rack ($d$) on the under side of the carriage in the manner of ordinary saw mills or in any other convenient way. The upper row of cutters is hung in a similar manner directly over those below and are supported in two pieces ($e$) of the frame like those above named and marked ($a$). One end of each of the string pieces ($e$) are fastened in mortises in two upright posts ($g$), the other ends are allowed to play up and down in mortises in posts ($g'$), so as to regulate the height of the front cutter (1). The elevation of these pieces ($e$) is regulated by wedges ($i$) that can be put into the mortises in the posts ($g'$) above or below said pieces; this adjustment is required in changing from stuff of one thickness to another.

The carriage is forced forward by any power applied to the pinion or other contrivance for moving the carriage, and the cutters are turned by coming in contact with the material to be cut.

Having thus fully described our improvements what we claim as our invention and desire to secure by Letters Patent is—

The employment of a series of cutters, the first of which has a blunt edge for indenting the surface instead of cutting it, the successive cutters being made progressively thinner and cutting deeper to the center, all substantially as described.

JOHN R. REMINGTON.
ROBERT BEALE.

Witnesses:
ALCŒUS B. WOLFE,
HENRY JENKINS.